Patented Jan. 28, 1930

1,744,946

UNITED STATES PATENT OFFICE

RAYMOND C. BENNER, OF BAYSIDE, NEW YORK, ASSIGNOR, BY MESNE ASSIGNMENTS, TO PREST-O-LITE STORAGE BATTERY CORPORATION, A CORPORATION OF INDIANA

SILICATED STORAGE-BATTERY SEPARATOR AND PROCESS OF MAKING THE SAME

No Drawing. Application filed December 14, 1923. Serial No. 680,733.

This invention relates to improvements in storage battery separators comprising cellulosic material impregnated with a silicate. Principal objects of the invention are to provide a dry-unwarped, silicate-impregnated separator, and to increase the porosity of silicated separators, as by incorporation of a soluble salt other than a silicate.

According to prior practice, wooden separator sheets have been saturated with sodium silicate solution and treated with acid to precipitate gelatinous silicic acid throughout the wood. After the acid treatment the separator must not be allowed to dry, as the precipitate loses its valuable properties on drying. It has been necessary to prevent drying also in the silicate-impregnated stage, for warping and cracking would otherwise be likely to take place. Silicated separators, therefore, have not been available in making up batteries in which the elements are retained in dry condition until the period of service is to begin. The handling, storage, and shipping of the separators are also complicated by the fact that they must be kept immersed in liquid or otherwise prevented from drying.

I have discovered that wooden separators saturated with a silicate solution may be satisfactorily dried by subjecting them to heat while preventing distortion and permitting escape of moisture. In an application Serial No. 651,335, filed July 13, 1923, by R. C. Benner and L. C. Werking, a separator drying process applicable in the present connection is described and claimed. According to that process, wet separators are passed slowly between a porous belt and a rotating heated drum. The compression of the separators between the belt and drum is sufficient to prevent warping during the drying period and the vapors evolved escape readily through the pores of the belt.

The drying operation is not limited to the precise details disclosed in the application mentioned. Various mechanical means may be adopted to hold the separators while the moisture is being expelled from them.

The silicate-impregnated separators to be dried should not be exposed in wet condition to the air for long periods. This may result in precipitation of silicic acid by the carbon dioxid of the air. After drying, however, the separators are substantially unaffected by such exposure.

The drying process may also be applied to fabricated sheets of cellulosic fiber saturated with a silicate solution, such as those described in my U. S. Patent No. 1,573,369, dated February 16, 1926. Or various composite separators, including a silicated sheet or mat as one element, may be dried. These may be separators of the type described in my application Serial No. 593,427, filed October 9, 1922, comprising a thin layer of silicated sulfite pulp placed on a relatively thick mass of fiber not treated with silicate.

For some purposes a silicated layer on only the side of the separator which will abut against the positive plate is sufficient to protect the separator against disintegration. Wet wooden sheets or equivalent material may be impregnated on one side only. Or such material may be covered on one side only with silicated porous paper or the like and the assembly passed through the drying device. The paper adheres to the wood and affords adequate protection to the separator. Silicated paper may be applied to one or both sides of the wooden sheet after it has been dried; in this case the assembly need not be passed through the drier.

Experience has shown that silicated separators are admirably adapted to withstand the action of the sulfuric acid electrolyte and the oxidizing influences of the battery. For some purposes, however, they add rather too much to the internal resistance. I have discovered that this defect may be corrected, without substantial loss of the advantageous properties of the separators, by use with the silicate of a soluble salt which does not form an insoluble precipitate when treated with sulfuric acid.

In a preferred form of the invention, sodium sulfate is added to the silicate to be used in impregnating the wood or equivalent material. Sodium silicate solution, of about 1.15 specific gravity, saturated with sodium sulfate, has been used with good results. The proportions may be considerably varied.

When dried separators containing the composite impregnating solution are treated with sulfuric acid, silicic acid is precipitated and the sulfate is dissolved. Porosity is increased by the removal of the soluble salt, but the separator is not made unduly pervious to particles of active material nor liable to disintegration. The sodium sulfate formed from the silicate, and the added sulfate, are not objectionable in the electrolyte.

Other compounds than the salts mentioned may be selected, having in mind the essential characteristics of solubility and harmlessness in the battery. For example, magnesium sulfate or aluminum sulfate is suitable. The term "porosity compound" will be used as generic to all such bodies.

Soluble silicates will generally be used, but it is within the scope of the invention to impregnate the separators with an insoluble silicate, which may be associated with a porosity compound. Impregnation with an insoluble silicate is disclosed and claimed in my U. S. Patent No. 1,495,568, dated May 27, 1924.

The separators impregnated with the silicate and the porosity compound preferably will be dried substantially as described, if they are not to be used at once. They may of course be treated with acid and retained in moist condition until desired for use.

I claim:

1. A dry separator comprising cellulosic material impregnated with a mixture of a silicate and a porosity compound.

2. A dry unwarped separator comprising sheet cellulosic material impregnated with a mixture of a silicate and a porosity compound.

3. A dry unwarped separator comprising sheet cellulosic material impregnated with a mixture of a silicate and sodium sulfate.

4. A cellulosic separator sheet impregnated with a mixture of a silicate and a porosity compound.

5. A cellulosic separator sheet impregnated with a mixture of sodium silicate and sodium sulfate.

6. A silicated separator having pores such as can be obtained by the herein described process which comprises impregnating a sheet of cellulosic material with a solution containing a silicate and sodium of sulfate and treating the sheet with an acid solution adapted to precipitate silicic acid and dissolve the sulfate.

7. Process of making silicated separators, comprising impregnating a cellulosic material with a solution containing a silicate and a porosity compound.

8. Process of making silicated separators, comprising impregnating wooden plates with a solution containing a silicate and a porosity compound.

9. Process of making silicated separators, comprising impregnating wooden plates with a solution containing sodium silicate and sodium sulfate.

10. Process of making porous silicated separators, comprising impregnating a cellulosic material with a silicate and a porosity compound, and treating the separator with an acid solution adapted to precipitate silicic acid and to dissolve the porosity compound.

In testimony whereof, I affix my signature.

RAYMOND C. BENNER.